R. A. MOORE.
PHOTOGRAPHIC APPARATUS.
APPLICATION FILED JULY 16, 1917.

1,294,821.

Patented Feb. 18, 1919.

INVENTOR
Robert A. Moore.
By Fay, Oberlin & Fay
ATTORNEYS.

UNITED STATES PATENT OFFICE.

ROBERT A. MOORE, OF DETROIT, MICHIGAN.

PHOTOGRAPHIC APPARATUS.

1,294,821.  Specification of Letters Patent.  Patented Feb. 18, 1919.

Application filed July 16, 1917. Serial No. 180,722.

*To all whom it may concern:*

Be it known that I, ROBERT A. MOORE, a citizen of the United States, and a resident of Detroit, county of Wayne, and State of Michigan, have invented a new and useful Improvement in Photographic Apparatus, of which the following is a specification, the principle of the invention being herein explained and the best mode in which I have contemplated applying that principle, so as to distinguish it from other inventions.

The present invention, relating as indicated to photographic apparatus, is more particularly concerned with a device adapted to be attached to a camera, using rolls of film for the purpose of providing a simple and convenient means for rolling up a used film and exposing the proper amount of unused film. As cameras are constructed at present it is necessary to keep a careful watch over the film as it is being unrolled in order to properly center the new film before the lens and many times the film is unrolled too far, with the result that the picture cannot be placed on the film.

Several devices have been invented intended for this purpose, but all of these, so far as the applicant is aware are extremely complicated and cumbersome and cannot be applied to a camera except at an excessive cost. To the accomplishment of the foregoing and related ends, said invention, then, consists of the means hereinafter fully described and particularly pointed out in the claims.

The annexed drawing and the following description set forth in detail certain mechanism embodying the invention, such disclosed means constituting, however, but one of various mechanical forms in which the principle of the invention may be used.

In said annexed drawing:—

Figure 2:
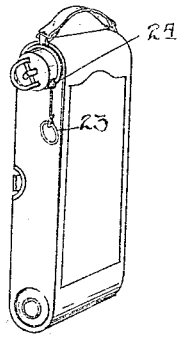
Figure 1:
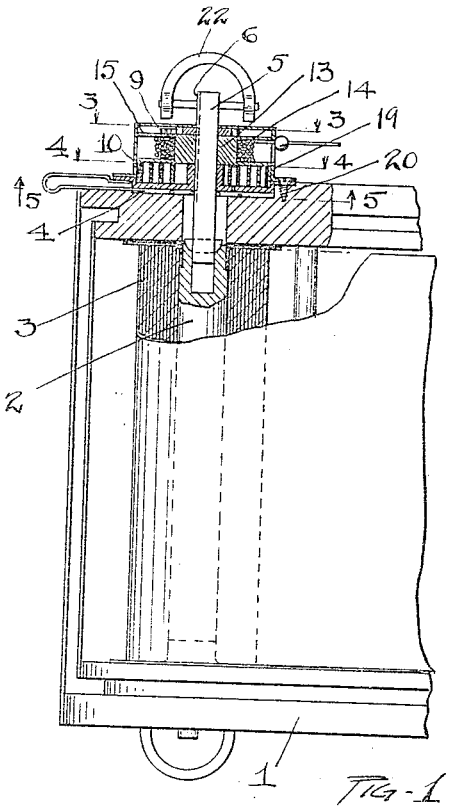
Figure 5:
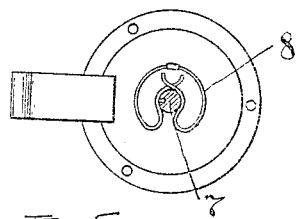
Figure 3:
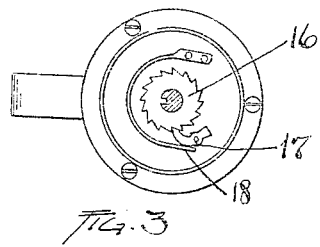
Figure 4:
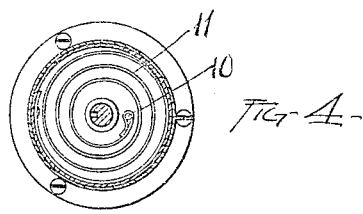

Figure 1 is an end view of a camera showing the same partially in section to illustrate my improved attachment; Fig. 2 is a view in perspective of the same; Fig. 3 is a section on the line 3—3, Fig. 1; Fig. 4 is a section on the line 4—4, Fig. 1; and Fig. 5 is a section on the line 5—5, Fig. 1.

Referring now to Fig. 1, there is shown a camera of the telescopic type 1 in which there is mounted a mandrel 2 about which is rolled a film 3. The mandrel 2 is provided at its upper end with a transverse slot or socket, which in the ordinary camera is adapted to be engaged by a longitudinally movable button for the purpose of rolling or unrolling the film on the mandrel and also to permit of the introduction and removal of the roll of film.

In order to install the present attachment on a camera it is only necessary to insert in the circular recess in the end board of the camera casing a slightly recessed plate 4. The plate 4 is provided with an aperture through which is passed a shaft 5 adapted to move longitudinally into engagement with the slots in the mandrel 2, and the shaft 5 is provided along one side with a key-way 6 in which there is disposed a key 7. A spring 8 is mounted about the shaft 5 to place a certain amount of frictional resistance thereon for purposes to be described later. On the plate or disk 4 is a collar 9, in which is journaled the shaft 5, and mounted on the disk is a pin 10 to which is attached one end of a flat coiled spring 11, the other end of the spring being attached to a downwardly extending flange 12 formed on a sheave 13 which is mounted about the shaft 5. Attached to the sheave 13 is a flexible cable or cord 14 which may be used for rotating the shaft 5 to wind up the film 3 on the mandrel 2.

The sheave 13 is provided with a thin plate or flange 15, between which and the plate extending to the flange 10 is coiled the cord 14. On top of the sheave and attached to the shaft 5 by the key-way 6 and key 7 is a ratchet wheel 16 with which is normally engaged a pawl 17 by means of a spring 18. Operation of the sheave in a clockwise direction (looking from above) will cause the pawl 17 on the sheave plate 15 to operate the shaft 5, but the reverse movement of the sheave will cause no movement of the shaft 5 as the ratchet 16 being keyed to the shaft as above described the pawl will then drag over the ratch 16 while the frictional resistance of the spring 8 will serve to prevent movement of the shaft 5. Mounted upon the disk 4 and coöperating therewith to inclose the coiled spring, the sheave, pawl and ratchet, and the cord, is a cup-shaped plate or casing 19 which is removably fastened to the plate 4 by means of screws 20. This cup-shaped casing is of little depth and as the plate 4 is set into the end board of the camera casing the casing 19 extends but little above the surface of the wall of the camera. Attached to the end of the shaft 5, which extends through an opening in the casing 19 is a handle member 22.

The operation of the device will be readily understood from the foregoing description. The mandrel is the receiving mandrel and after a picture has been taken the cord 14, which extends through an opening in the side of the casing 19, is drawn out to its full length. The full length of this cord is figured to wind up on the mandrel 2 exactly the amount of film which has been exposed for the picture previously taken and to expose a similar amount of film for the next picture. For convenience the end of the cord 19 is provided with a ring 23 which may be slipped over the operator's finger and is knotted as at 24 in order to maintain the wound portion of the cord taut. As soon as the cable 14 is drawn out to wind up the exposed film the spring 11 is coiled and the tension of this spring serves to withdraw and wind up the cord 13. It has been found unnecessary to make any allowance for the gradually increasing effective diameter of the film of the mandrel 2, as it has been found sufficient to permit the exposed portions of the film to extend over the sides of the projected area of the lens a slight distance which will bring the middle exposure of the film directly in front of the lens, although the end exposures will be very slightly out of position. The present device is not only extremely simple in its construction, but is convenient to operate and can be readily manufactured at a relatively low cost.

Other modes of applying the principle of my invention may be employed instead of the one explained, change being made as regards the mechanism herein disclosed, provided the means stated by any of the following claims or the equivalent of such stated means be employed.

I therefore particularly point out and distinctly claim as my invention:—

1. In a camera, the combination of a film mandrel, of a plate set into one end wall of the camera casing, a shaft journaled in said plate and movable into engagement with said mandrel, a coiled spring having its ends connected respectively to said shaft and said plate, a flexible operating member connected at one end to said shaft, and a cup-shaped casing mounted upon said plate and inclosing said spring and member, said casing having an opening therethrough and the free end of said flexible member extending from such opening.

2. In a camera, the combination with a film mandrel, of a plate set into one end wall of the camera casing, a shaft journaled in said plate and movable into engagement with said mandrel, a coiled spring having one end attached to said plate, a sheave rotatably mounted on said shaft, the other end of said spring being attached to said sheave, a cable coiled about said sheave and adapted upon unwinding to rotate said sheave a predetermined number of times, and pawl and ratchet means adapted to connect said sheave and said shaft for conjoint movement in one direction only.

3. In a camera, the combination with a film mandrel, of a plate set into one end wall of the camera casing, a shaft journaled in said plate and movable into engagement with said mandrel, a coiled spring having one end attached to said plate, a sheave rotatably mounted on said shaft, the other end of said spring being attached to said sheave, a cable coiled about said sheave and adapted upon unwinding to rotate said sheave a predetermined number of times, pawl and ratchet means adapted to connect said sheave and said shaft for conjoint movement in one direction only, and frictional means tending to restrain said shaft from movement.

Signed by me this 10 day of July, 1917.

ROBERT A. MOORE.

Copies of this patent may be obtained for five cents each, by addressing the "Commissioner of Patents, Washington, D. C."